United States Patent [19]

Miyamoto

[11] Patent Number: 5,036,354

[45] Date of Patent: Jul. 30, 1991

[54] DOCUMENT SIZE DETECTION DEVICE

[75] Inventor: Hirohisa Miyamoto, Osaka, Japan

[73] Assignee: Minolta Camera Kabushiki Kaisha, Osaka, Japan

[21] Appl. No.: 522,187

[22] Filed: May 11, 1990

[30] Foreign Application Priority Data

May 11, 1989 [JP] Japan .................................. 1-117958

[51] Int. Cl.$^5$ .............................................. G03B 27/62

[52] U.S. Cl. ...................................... 355/75; 355/311; 355/317

[58] Field of Search ................... 355/51, 75, 208, 286, 355/311, 218, 317, 209; 250/560; 356/383; 271/154

[56] References Cited

U.S. PATENT DOCUMENTS

| | | | |
|---|---|---|---|
| 3,957,368 | 5/1976 | Goshima et al. | 355/51 X |
| 4,025,180 | 5/1977 | Kurita et al. | 355/286 |
| 4,095,879 | 6/1978 | Katayama et al. | 355/317 X |
| 4,192,608 | 3/1980 | Goshima et al. | 355/51 |
| 4,585,332 | 4/1986 | Shenoy | 271/154 X |
| 4,614,874 | 9/1986 | Fukuda et al. | 250/560 |
| 4,615,610 | 10/1986 | Yoshiura | 355/208 X |
| 4,659,214 | 4/1987 | Takemura et al. | 355/75 |
| 4,668,079 | 5/1987 | Ibuchi | 355/311 X |
| 4,713,550 | 12/1987 | Anzai et al. | 355/75 X |
| 4,811,047 | 3/1989 | Hosaka et al. | 355/218 X |
| 4,814,833 | 3/1989 | Matsushita et al. | 355/311 X |
| 4,823,165 | 4/1989 | Narukawa et al. | 355/75 |
| 4,933,720 | 6/1990 | Takano et al. | 355/209 |
| 4,939,377 | 7/1990 | Okuda et al. | 356/383 |
| 4,954,846 | 9/1990 | Matsuo | 355/75 X |

FOREIGN PATENT DOCUMENTS 61-172137 8/1986 Japan .

*Primary Examiner*—Richard A. Wintercorn
*Attorney, Agent, or Firm*—Joseph W. Price

[57] ABSTRACT

A document size detection device comprising an illuminating unit for irradiating a first light on a document on a platen; a projecting unit for projecting the first light reflected on the document onto a photosensitive member; a document cover for covering the document on the platen, the cover having a reflecting area for reflecting the first light from the illuminating unit and a non-reflecting area for transmitting the above light; a document detection sensor provided at a position corresponding to the non-reflecting area and comprising a light emitting element and a light receiving element; and a filter for transmitting a second light from the light emitting element as well as guiding the first light from the illuminating unit to the projecting unit, the filter unit being opposed to a detecting surface of the sensor.

19 Claims, 15 Drawing Sheets

DOCUMENT SIZE DETECTION DEVICE

BACKGROUND OF THE INVENTION (1) Field of the Invention

The present invention refers to a document size detection device, for use in an image forming apparatus or the like, which detects a size of a document placed on a platen. More precisely, the document size detection device comprises a multiplicity of reflection-type light sensors inside a document cover, wherein a light emitted from a light emitting element of each sensor is projected on the document and the reflected light is detected by a receiving element of the sensor, whereby the document size is detected.

(2) Description of the Related Art

A document size detection device is applied to, for example, a copier. Usually, the copier equipped with a document size detection device has a multiplicity of feeding cassettes for accommodating papers of different sizes (A4, B4, etc.). The appropriate-sized paper for the document is automatically selected and fed, whereby smooth and accurate copying is effected.

FIGS. 1*a* and 1*b* show a document size detection portion of such a copier. The copier comprises a document cover 1000 for pressing a document d on a platen 1100. The document cover 1000 has a pressing sheet 1200 formed of a white resin film on a bottom surface thereof, and the sheet 1200 has multiple detection holes 1200*a* at specified positions. (FIGS. 1*a* and 1*b* show only one detection hole 1200*a*.) Each detection hole 1200*a* is covered with an infrared ray transmitting filter 1120, which is formed of a material that transmits infrared rays but shields visible lights.

The document cover 1000 contains multiple sensors F above the holes 1200, respectively, inside the document cover 1000. (FIGS. 1*a* and 1*b* show one of the sensors.) Each sensor is equipped with an infrared ray emitting element 1110*a* and an infrared ray receiving element 1110*b*. When an infrared ray emitted from the emitting element 1110*a* is reflected on the document d and received by the receiving element 1110*b* as shown with optical paths $R_0$ and $R_1$, the sensor F detects the document d in a detecting area thereof. The document size is judged by which sensor(s) detects the document d in the detecting area(s) thereof.

The copier has a scanner 200 below the platen 1100, the scanner being movable in a direction of an arrow e. The scanner 200 comprises an exposure lamp 210 and a mirror 220. A visible light emitted from the exposure lamp 210 is reflected on the document d and then on the mirror 220 as shown with optical paths $R_2$ and $R_3$ and guided to an image forming section (not shown) to expose a photoconductive drum.

Usually, it is desirable that the infrared ray transmitting filter 1120 has a smooth surface in order to enhance the infrared ray transmitting efficiency. If there is no document at the corresponding portion with the hole 1200*a* (FIG. 1*b*), a visible light emitted from the exposure lamp 210 ($R4$) is mostly regularly reflected on the filter 1120 ($R_6$). That means less quantity of light follows an optical path $R_5$, which is the ideal path to the photoconductive drum. As a result, the filter 1120 covering the hole 1200*a* is misread as an image and a shade is formed in a portion of the paper which corresponds with the position of the hole 1200*a*, namely, on the margin. This occurs when a paper having an image copied thereon has a margin, for example, when the document d is copied on a paper which is larger than the document d or when the document d is reduction-copied on a same-sized paper.

SUMMARY OF THE INVENTION

Accordingly, the present invention has an object of offering a document size detection device which avoids misreading a filter covering a detection hole of a document cover as an image and thus remarkably enhances copy quality.

The above object is fulfilled by a document size detection device comprising illuminating means for irradiating a first light on a document on a platen; projecting means for projecting the first light reflected on the document onto a photosensitive member; a document cover for covering the document on the platen, the cover having a reflecting area for reflecting the first light from the illuminating means and a non-reflecting area for transmitting the above light; a document detection sensor provided at a position corresponding to the non-reflecting area and comprising a light emitting element and a light receiving element; and filter means for transmitting a second light from the light emitting element as well as guiding the first light from the illuminating means to the projecting means, the filter means being opposed to a detecting surface of the sensor.

The above object is also fulfilled by a document size detection device comprising at least an infrared ray emitting and receiving sensor provided inside a document cover of an image forming apparatus, wherein an infrared ray emitted from an emitting element of the sensor, transmitted through a detection hole provided on the document cover and reflected upon the a document is received by a receiving element of the above sensor, whereby to detect a size of the document; the document size detection device being characterized in that an infrared ray transmitting filter is provided opposedly to a detecting area of the sensor, wherein the filter covers the detection hole, the filter being inclined with such an angle that a light from an image reading optical system of the image forming apparatus be regularly reflected on the filter and guided to an image carrier of the image forming apparatus. This document size detection device will be referred to as "A".

In the above construction, the first light going toward the non-reflecting area of the document cover is guided to the projecting means by the filter means. Therefore, even if there is no document at a corresponding position with that of the detection hole, the above light is projected on the photosensitive member accurately as well as the light reflected on the reflecting area of the document cover. The result is high copy quality.

The present invention has another object of offering a document size detection device which realizes high copy quality and document detecting accuracy with a simple construction.

The above object is fulfilled by a document size detection device comprising illuminating means for irradiating a first light on a document on a platen; projecting means for projecting the first light reflected on the document onto a photosensitive member; a document cover for covering the document on the platen, the cover having a reflecting area for reflecting the first light from the illuminating means and a non-reflecting area for transmitting the above light; a document detection sensor provided at a position corresponding to the non-reflecting area and comprising a light emitting element and a light receiving element; filter means opposed to a detecting surface of the sensor; switching mean for switching the filter means to one of a first state of guiding the first light from the illuminating means to the projecting means and a second state of transmitting the second light emitted from the document detection sensor and reflected on the document; and control means for controlling the switching means.

The above object is also fulfilled a document size detection device "A", further comprising switching means for automatically switching the above angle to another angles so that the filter lie down horizontally when the image forming apparatus is in other modes than document size detection.

According to the above construction, the switching means switches the filter means to one of the first state of guiding the first light from the illuminating means to the projecting means and the second state of transmitting the second light emitted from the emitting element of the sensor. Therefore, projection on the photosensitive member is accurately done, and also the second light is effectively detected by the receiving element of the sensor. As a result, copy quality and document detecting accuracy are enhanced.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENTS

Embodiment I

A copier employing a document size detection device according to this invention will be described referring to FIGS. 1 through 9 as a first embodiment.

Upper portion construction

Figure 1A:
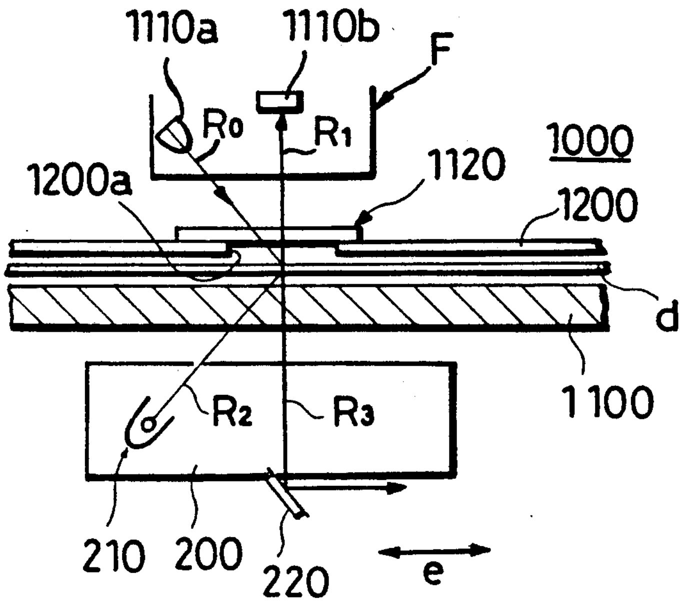
Fig. 1a Prior art
FIGS. 1*a*, and 1*b* are vertical cross sectional views of a document size detection portion of a conventional document, size detection device.
Figure 1B:
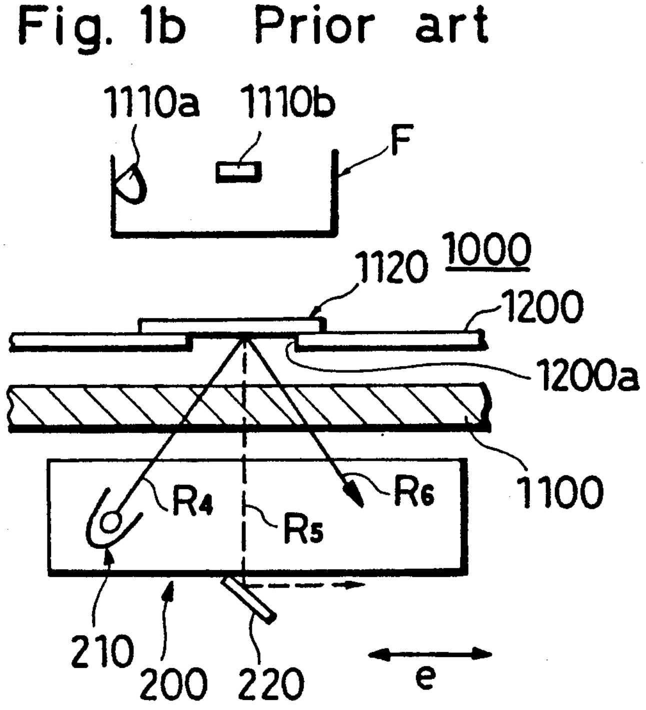
Fig. 1b Prior art
Figure 2:
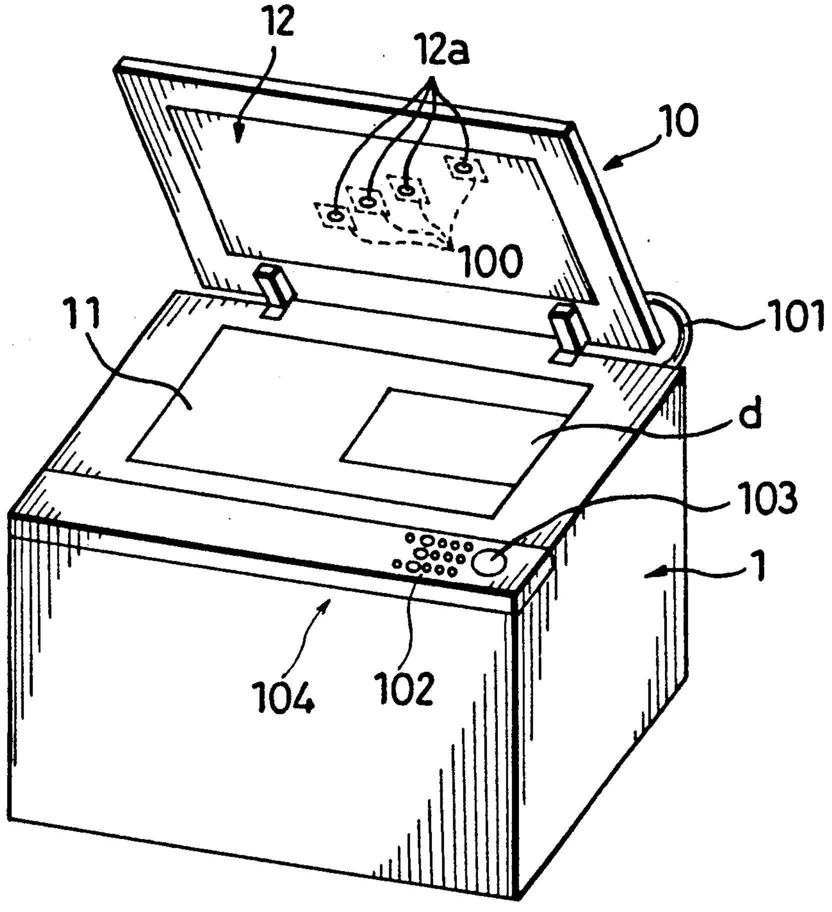
FIG. 2. is a perspective view of a first embodiment namely, a copier employing a document size detection device according to this invention.

As shown in FIG. 2, the copier comprises a main body 1 and a document cover 10 has pivotally attached to the main body 1 and pressing a document d on a platen 11 when closed. The cover 10 has a pressing sheet 12 formed of a white resin film pasted on a bottom surface thereof, and the sheet 12 has four detection holes 12*a*.

The cover 10 also an internal space therein, where four document size detection units 100 are provided at corresponding positions with those of the detection holes 12*a*, respectively. The document size detection units 100 are electrically connected to a CPU 7 through a harness 101. The practical arrangement of the detection holes 12*a* and the document size detection units 100 and the precise construction of the units 100 will be described later.

At an upper front corner of the main body 1 is an operation panel 104 equipped with a print switch 103 for commanding start of copying operation, and ten keys 102 for inputting copy number and the like. Although not shown here, the operation panel 104 is equipped with other keys including an APS key for selecting the APS mode (APS: automatic paper size selection), an AMS key for selecting the AMS mode (AMS: automatic magnification ratio selection), a paper size selection key, and a magnification ratio selection key. In the APS mode, the paper size is automatically selected in accordance with the document size and the magnification ratio which has been commanded by the operator. In the AMS mode, the magnification ratio is automatically selected in accordance with the document size and the paper size which has been commanded by the operator.

Optical system construction

Figure 3:
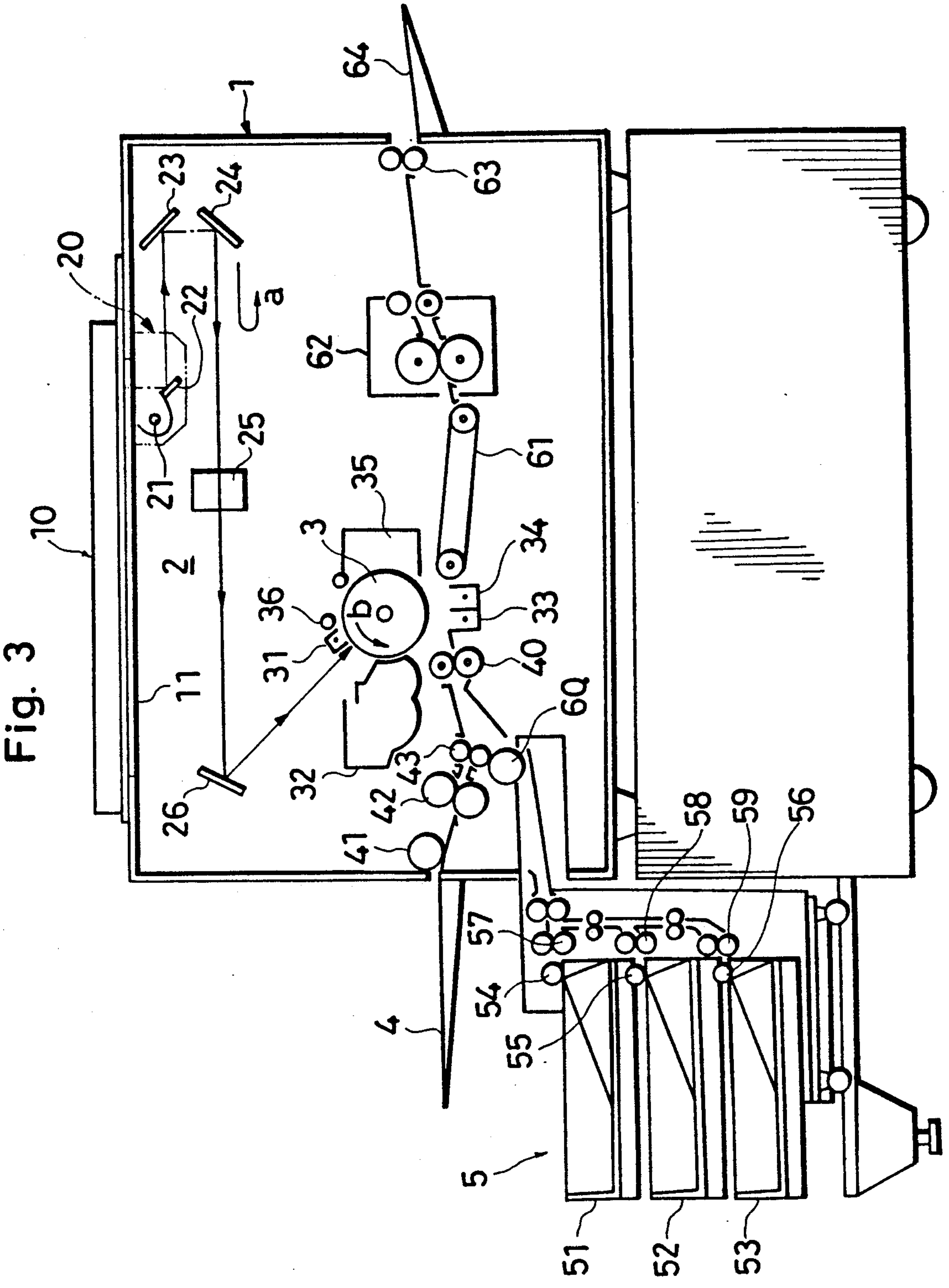
FIG. 3 is a schematic elevational view of the same.

As shown in FIG. 3, an optical system 2 is provided below the platen 11. The optical system 2 comprises a scanner 20 equipped with an exposure lamp 21 and a first reflecting mirror 22, second and third reflecting mirrors 23 and 24, a projection lens 25 and a fourth reflecting mirror 26.

The scanner 20 is provided movably as shown with an arrow a and its scanning speed is set to be V/m (V: circumferential speed of the photoconductive drum 3 and invariable irrespective of the magnification ratio; m: magnification ratio). The second and the third mirrors 23 and 24 are provided also movably as shown with the arrow a and its scanning speed is set to be V/2m.

Image forming and transporting system construction

Image forming and transporting systems are provided below the optical system 2.

The image forming system comprises the photoconductive drum 3 which is rotatable in a direction of an arrow b by a driving source (not shown), a main charger 31, a developing unit 32, a transfer charger 33, a separating charger 34, a cleaning unit 35, an erasure lamp 36 and a fixing unit 62. The above members except the drum 3 are arranged around the drum 3 in a direction of an arrow b in this order.

The transporting system comprises a feeding roller 41 for feeding a paper from a manual feeding table 4, transporting rollers 42 and 43 for transporting the paper fed by the roller 41, feeding rollers 54 through 56 for feeding papers from cassettes 51 through 53 (51 through 53 forming a cassette unit 5) respectively, transporting rollers 57 through 59 for transporting the papers fed by the rollers 54 through 56 respectively, a feeding roller 60, a timing roller 40, a transporting belt 61, and a pair of delivering rollers 63. The cassettes 51 through 53 accommodate different sizes of papers (A4, B4, etc.) in parallel with or perpendicularly to the paper transporting direction.

Copier operation

The copier having the above construction is operated in the following way.

The document d is placed on the platen 11 and the document cover 10 is closed. When the print switch 103 is turned on, the document size detection (will be described in detail later) is executed. Then, the following copying operation is carried out.

A light irradiated from the exposure lamp 21 and reflected on the document d passes through the mirrors 22, 23, and 24, the projection lens 25 and the fourth mirror 26, and exposes the photoconductive drum 3 disposed below the optical system 2.

A portion of the surface of the drum 3 to be exposed is uniformly charged before it is exposed. When it is exposed, the charge of that portion is removed in accordance with the light intensity of the exposure, whereby an electrostatic latent image is formed on that portion. A toner is supplied to the electrostatic latent image by the developing unit 32 to turn it into a toner image.

On the other hand, a paper is fed from the table 4 or the cassettes 51, 52 or 53 by its corresponding rollers and is further transported by the roller 60 until it is stopped by the timing roller 40. The timing roller 40 times the scanner 20 movement and the drum 3 rotation, whereby advancing the paper at an appropriate timing.

When the paper reaches below the drum 3 in contact therewith, the toner image is transferred by the transfer charger 33 onto the paper. The paper is separated from the drum 3 by the separating charger 34, and is then carried by the transporting belt 61 to the fixing unit 62. After the image on the paper is fixed by the fixing unit 62, the paper is delivered through the rollers 63 onto a delivery tray 64.

The residual toner which has not been used to make the above toner image is scratched off by the cleaning unit 35, and the residual charge on the drum 3 is removed by the erasure lamp 36 to prepare the drum 3 for the next exposure.

Document size detection section construction

Figure 4A:
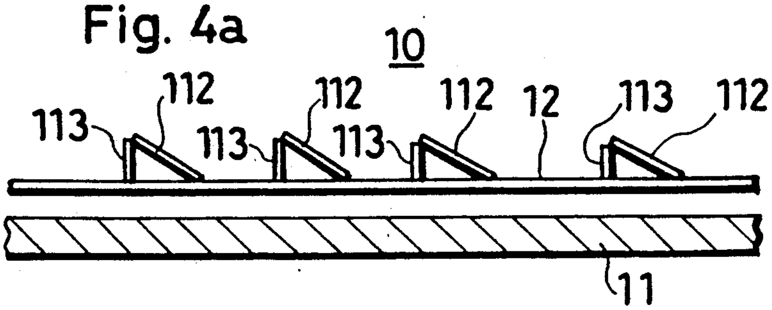
FIG. 4*a* is a cross sectional view of a multiplicity of infrared ray transmitting filters 112 and their vicinity.
Figure 4B:
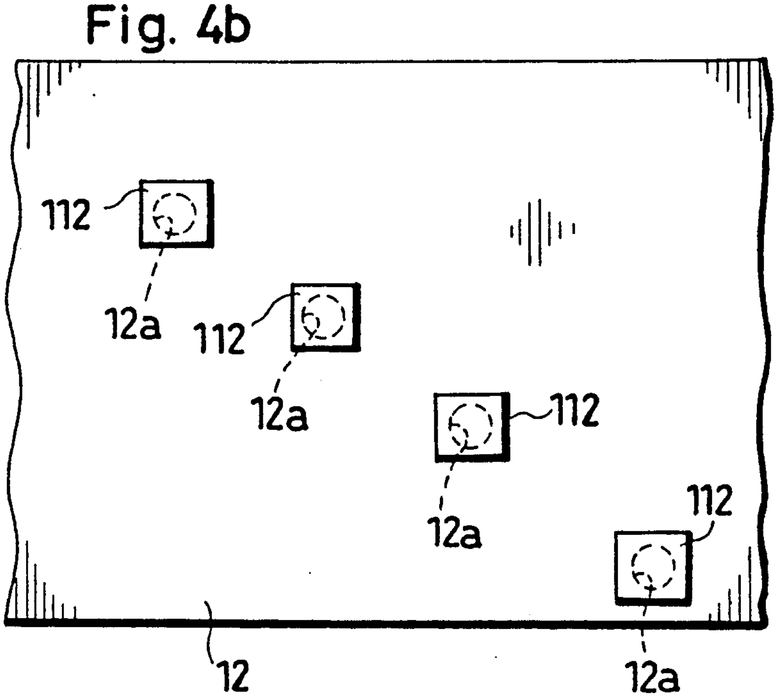
FIG. 4*b*, is a plan view thereof.

As shown in FIGS. 4*a* and 4*b*, the detection holes 12*a* are covered with infrared ray transmitting filters 112. The filters 112 are formed of a material which transmits infrared rays but shields visible lights. For example, "COLD MIRROR" manufactured by Matsuzaki Shinku Co., Ltd. is used as the filters.

Figure 5:
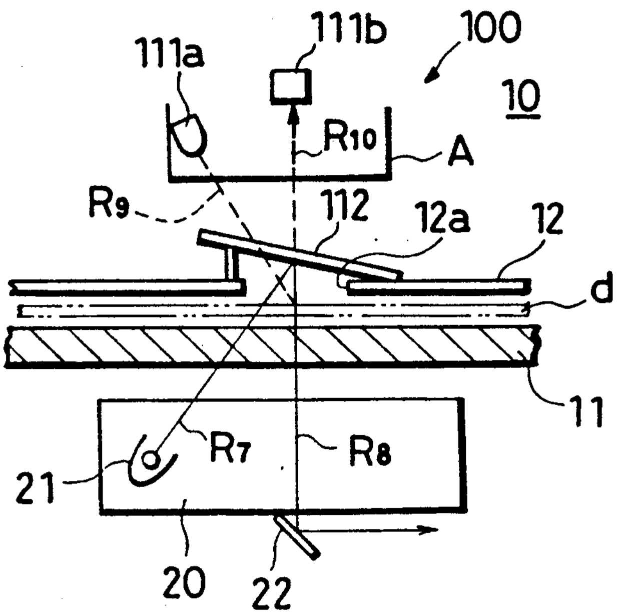
FIG. 5 is a view explaining the principle of adjusting the angle of inclination of an infrared ray transmitting filter 112.

Each filter 112 is inclined and is supported along a left side thereof (FIG. 4*a*) by a spacer 113 provided to the left of the detection hole 12*a*. In FIG. 5, there is no document on the platen 11 but the document cover 10 is closed. The angle of inclination is set so that a light which is emitted from the exposure lamp 21 and reflected substantially regularly on the filter 112 (optical paths $R_7$ and $R_8$) may reach the photoconductive drum 3 through the first mirror 22. For example, the above angle is set approximately half of the angle made by the optical paths $R_7$ and $R_8$. More precisely, the quantity of light which is reflected on the filter 112 and reaches the photoconductive drum 3 should be the same or larger than the quantity of light which is reflected on a white document or the pressing sheet 12 having a reflectance of 20% and reaches the drum 3. Such setting prevents a copying paper from having an unnecessary stain in a margin thereof and thus improves copy quality.

The inclined filter 112 makes a shade in the vicinity of the spacer 113 since the filter 112 is a step above the sheet 12. However, the shade is negligibly small if the detection hole 12*a* has a diameter of, for example, 3 mm or less.

Above the filters 112 are four document detection sensors A through D, each having an infrared ray emitting element 111*a* and an infrared ray receiving element 111*b*. (FIG. 5 shows only the sensor A.)

The document detection sensor A has a construction in which, when the document d is placed on the platen 11, an infrared ray emitted from the emitting element 111*a* is reflected on the document d as shown with $R_9$ and $R_{10}$ and received by the receiving element 111*b*. In other words, whether there is the document d in a detection area of the sensor A or not is judged by the quantity of the infrared rays received by the receiving element 111*b*.

Figure 6:
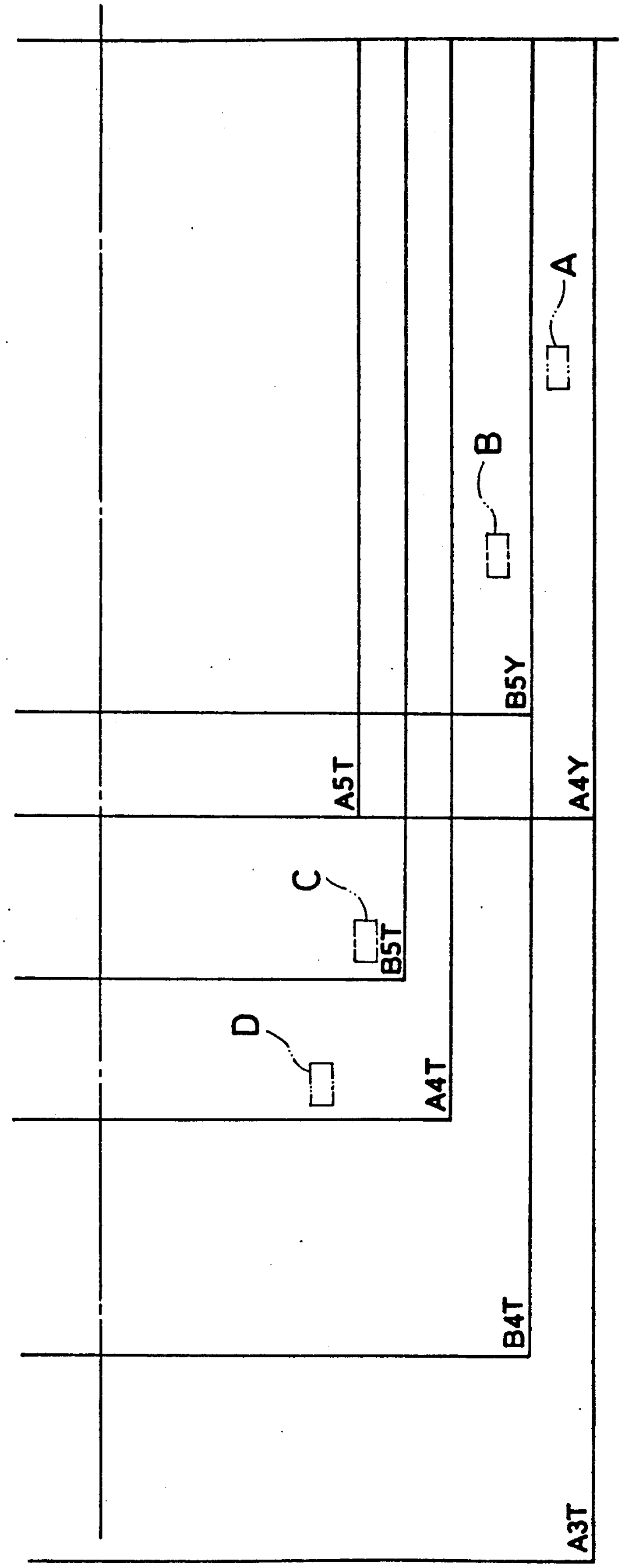
FIG. 6 exemplifies positional relationship between document detection sensors A through D and regular-sized documents.
Figure 7:
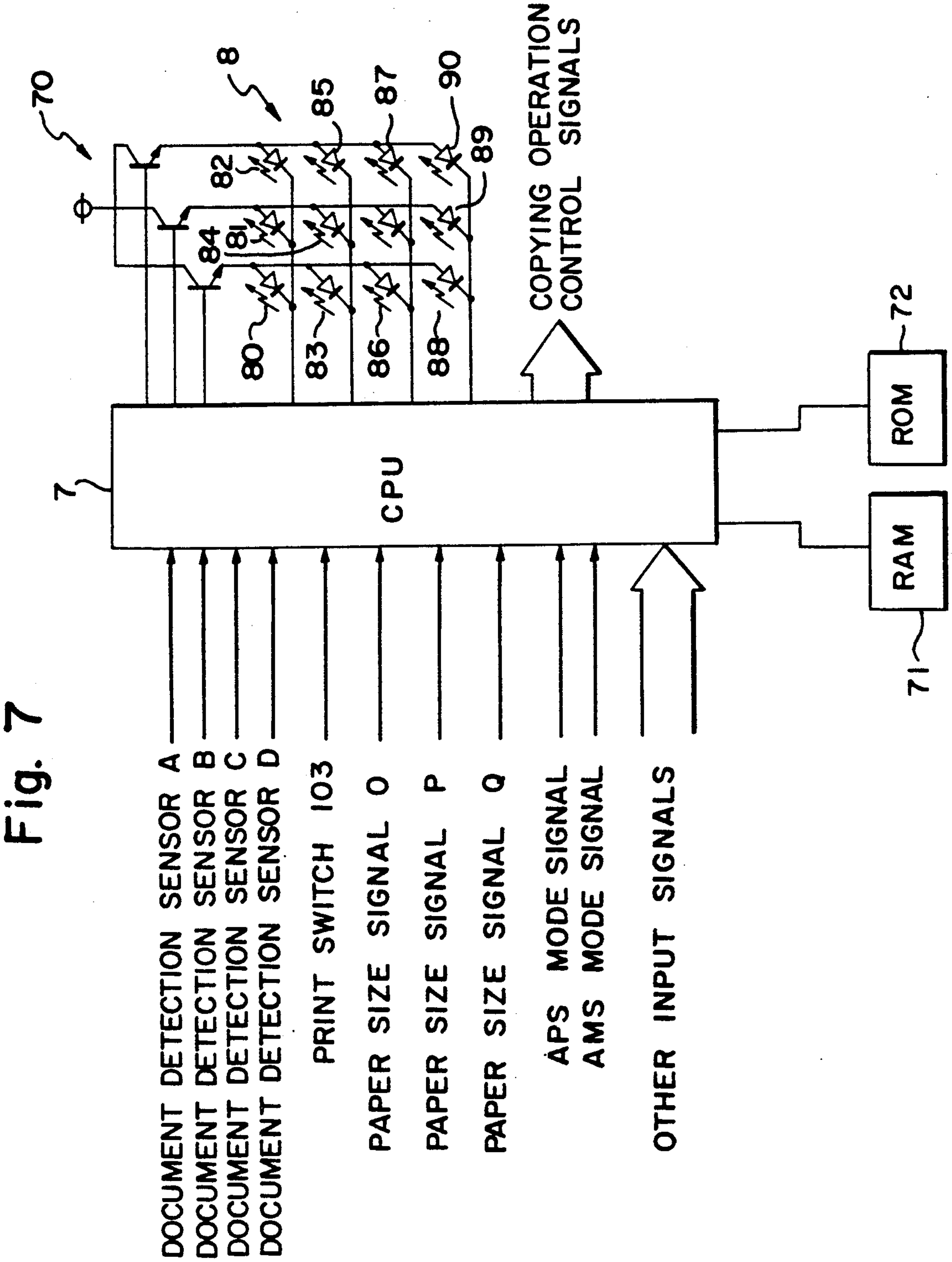
FIG. 7 is a block diagram of a first control system of the first embodiment.

The four sensors A through D are arranged as shown in FIG. 6, for example. Which sensor(s) detects the document d in the detecting area(s) thereof depends on each of the seven combinations of the document size (A4, B4 or B5) and the direction in which the document is placed (Table 1).

TABLE 1

| | A | B | C | D |
|---|---|---|---|---|
| A3T | ○ | ○ | ○ | ○ |
| B4T | x | ○ | ○ | ○ |
| A4T | x | x | ○ | ○ |
| A4Y | ○ | ○ | x | x |
| B5T | x | x | ○ | x |
| B5Y | x | ○ | x | x |
| A5T | x | x | x | x |

T: Longer side of the document d is along the transporting direction.
Y: Shorter side of the document d is along the transporting direction.
○: The sensor detects the document d in its detecting area.
x: The sensor detects no document in its detecting area.

Hereinafter, "size" will means the combination of the actual size of the document and the direction in which the document is place. For instance, B5T and B5Y are of different sizes.

Control system construction

A control system (FIG. 7) is provided in a specified position inside the main body 1 and comprises a first control section 70 including a CPU 7, a RAM 71 and a ROM 72, the control section 70 being for executing logical operation based on outputs from the sensors A through D for the purpose of, mainly, judging the size of the document d.

The control system also comprises a second control section (not shown) for executing overall control of the copier such as selecting one of the feeding cassettes 51 through 53 and carrying out copying operation. Instead of providing two control sections, the control section 70 may also execute the overall control.

The CPU 7 has input ports for receiving the following signals: signals from the document detection sensors A through D, a print start signal from the print switch 103, paper size signals 0, P and Q indicating the sizes of the papers accommodated in the cassettes 51 through 53, an APS mode signal from the APS key, an AMS mode signal from the AMS key, signals from the ten keys 102, and other signals.

The CPU 7 also has output ports which are connected to a display section 8, actuators of various sections of the copier and the like, the output ports being for mainly outputting control signals for the copier.

The display section 8 comprises LEDs 80 through 90. The LEDs 80 through 86 are for displaying the selected paper size, the LED 87 for indicating that the copier is in the AUTO mode (the APS mode or the AMS mode). The LEDs 88 and 89 are for indicating that the copier is in the APS mode and the AMS mode, respectively. The LED 90 is for indicating that copying is impossible, in other words, the selected sized-paper is not set in the APS mode or the selected magnification ratio is inappropriate in the AMS mode.

Control operation of the CPU 7

The control operation of the CPU 7 will be described referring to FIGS. 8 and 9.

When a power switch (not shown) is turned on, a control program stored in the RAM 72 is executed. Namely, the CPU 7 and all sections of the copier are initialized, the contents of the RAM 71 are cleared, and other members such as a timer (not shown) are also initialized (S1).

After the timer is started (S2), commands are acceptable from the panel 104, namely, from the print switch 103 and the APS, AMS, paper size selection, magnification ratio selection and other keys (S3). Then, the operation goes into a document size detection subroutine for judging the size of the document d (S4). An example of the above subroutine is indicated in FIG. 9.

In S401, whether the copier is in the AUTO mode or not is judged. If not, the operation returns to the main routine since the paper size and the magnification ratio should be determined by the operator irrespective of the size of the document d.

If the copier is judged to be in the AUTO mode in S401, whether the print switch 103 has just been turned on or not is judged (S402). In order to judge correctly that the switch 103 has just been turned on, not has been kept on, this judgment is done by detecting, for example, an edge from OFF to ON of the print start signal (will be referred to as an ON-edge hereinafter).

If an ON-edge of the print start signal is not detected in S402, the operation returns to the main routine. If it is detected, the signals from the document detection sensors A through D are read, and the size of the document d is judged (S403). This judgment is done by logical operation of the signals from the sensors A through D based on Table 1. For example, if the AND of these signals indicates that the document d exists in the detecting areas of all four sensors, the size of the document d is judged A3T. Other detecting methods such as decoding the signals based on code data stored in the RAM 72 may also be employed.

Then, whether the document d is of any regular size (indicated in Table 1) or not is judged (S404). If so, whether the copier is in the APS mode or not is judged (S405). If so, the paper size is selected based on the document size and the magnification ratio commanded by the operator (S406). For example, if the document size is A3T and the magnification ratio is 1, the A3T paper is selected. If the magnification ratio is 0.71, the A4T paper is selected.

In S407, S409 and S411, whether the selected-sized paper is accommodated in one of the feeding cassettes 51 through 53 or not is judged. If so, the LED among 80 through 86 which indicates the selected paper size is lighted up, and this size is stored in the work area of the RAM 71 (S408, S410 or S412). Thereafter, the operation returns to the main routine.

If the copier is not in the APS mode in S405, it is in the AMS mode. Accordingly, the magnification ratio is selected based on the document size and the paper size commanded by the operator (S414). For example, if the document size is A3T and the paper size is A5T, the magnification ratio of 0.5 is selected.

Then, whether the selected magnification ratio is available in the copier or not is judged (S415), and if so, the ratio is stored in the work area of the RAM 71 (S415) and the operation returns to the main routine.

In the following cases, the operation goes to S413: if the document d is not of any regular size in S404, if the selected-sized paper is not accommodated in any of the feeding cassettes 51 through 53 (S407, S409 or S411), or if the selected magnification ratio is not available in the copier (S415). In S413, the LED 90 is lighted up to indicate that copying cannot be done either in the APS or the AMS mode. Also in S413, a signal indicating that copying should be stopped is stored in the work area of the RAM 71, thereafter the operation returns to the main routine.

After the above subroutine, signals such as a cassette selection commanding signal and a copying stop commanding signal are sent to and received from the second control section based on the data stored in the work area of the RAM 71 (S5). The second control section carries out the overall control including cassette selection and copying start and stop. The cassette selection and the copying stop may be done in the document size detection subroutine.

Then, whether the time set in the timer in S2 is up or not is judged (S6), and if not, the judgment of S6 is repeated until the time is up. The judgment is repeated in order to keep the time for S2 through S6 uniform and thus synchronize the operations of the first control section and the second control section, the second section having a similar timer.

Embodiment II

A second embodiment of this invention will be described referring to FIGS. 10 through 16.

Identical members with those of the first embodiment have the same reference numerals, and explanation will be omitted concerning them.

In this embodiment, the shade formed on the paper by the inclined infrared ray transmitting filter 112 (mentioned in the first embodiment) is prevented for the purpose of enhancing copy quality and document size detecting accuracy.

For the higher copy quality only, the angle of inclination of the filter 112 is desirably set so that the light from the exposure lamp 21 may be guided to the photoconductive drum 3. However, optical filters such as the infrared ray transmitting filters 112 have an optical characteristic that the quantity of light reflected on the filter is increased in accordance with the angle of incidence, which may lower transmitting efficiency. If the transmitting efficiency is low, the quantity of light emitted from the light emitting element **111*a* or reflected on the document d and received by the light receiving element 111*b* is reduced. This decreases document size detecting accuracy. Even if the light intensity or light receiving sensitivity is increased, noise such as external random lights can cause detecting errors. Considering these conditions, it is desirable that the relative positions of the document detecting sensor and the filter 112 is determined so that the filter 112** may receive the light with an appropriate angle of incidence.

However, ideal positioning is hard to realize because it is restricted by various conditions such as the size of the document cover 10.

In the second embodiment, the angle of inclination of the filter 112 is automatically switched over in accordance with if the copier is in document size detection or copying. In this way, copy quality and document size detecting accuracy are enhanced.

Document cover and its vicinity

Figure 10:
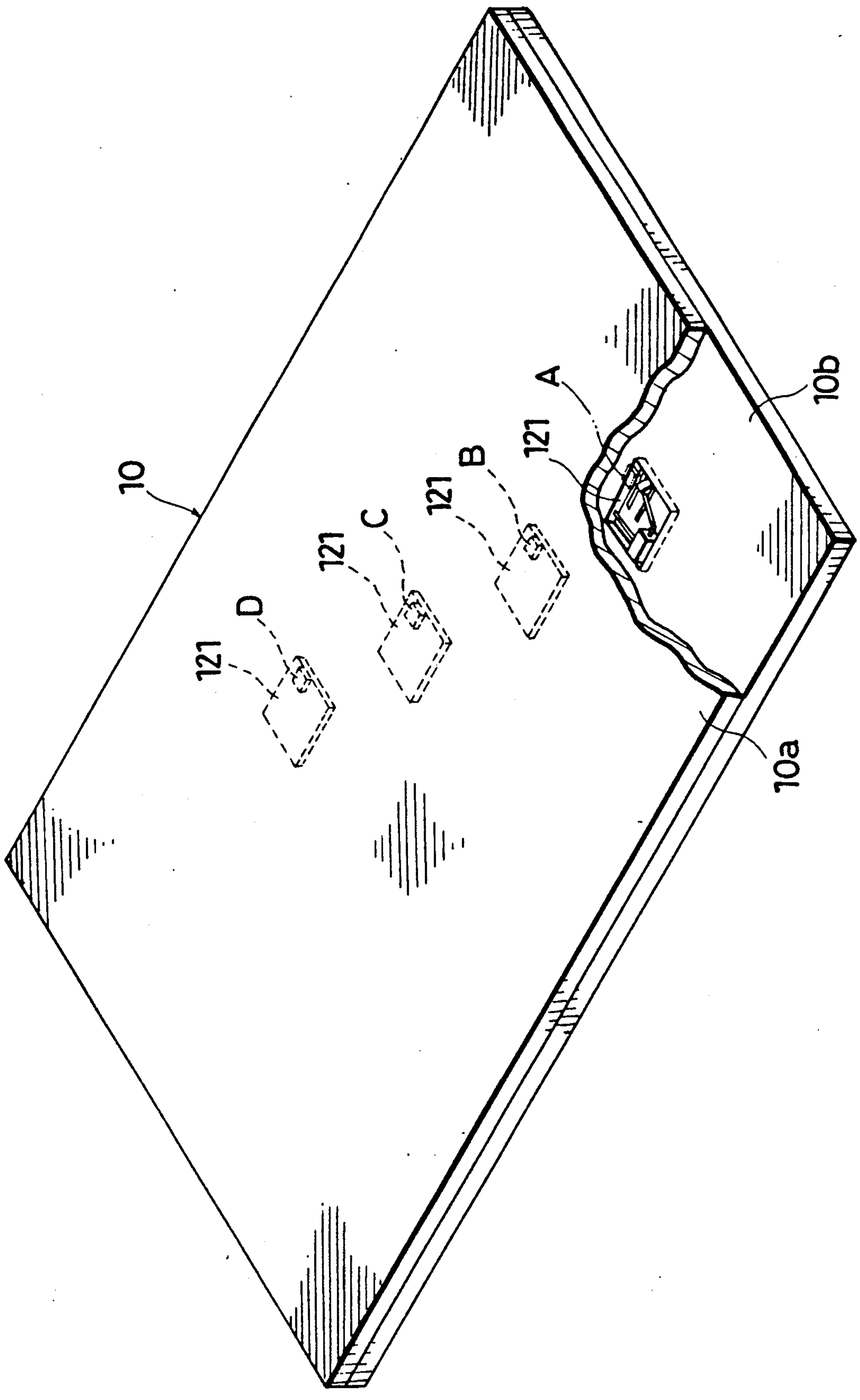
FIG. 10 is a partially cut-out perspective view of a document cover 10 of another copier employing a second embodiment according to this invention.
Figure 11:
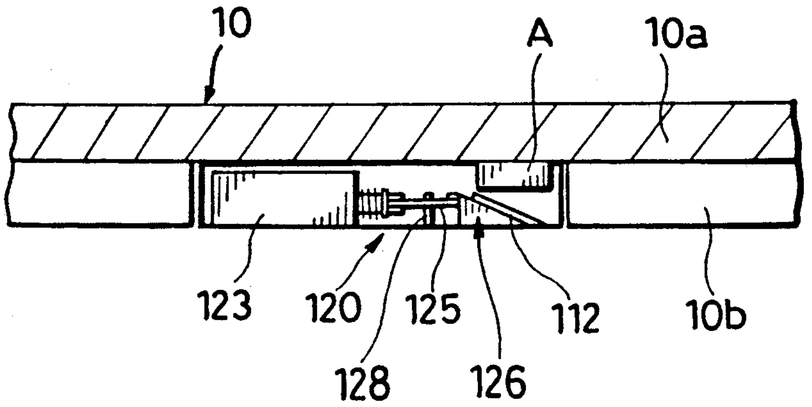
FIG. 11 is a partial cross sectional view of the same.
Figure 12:
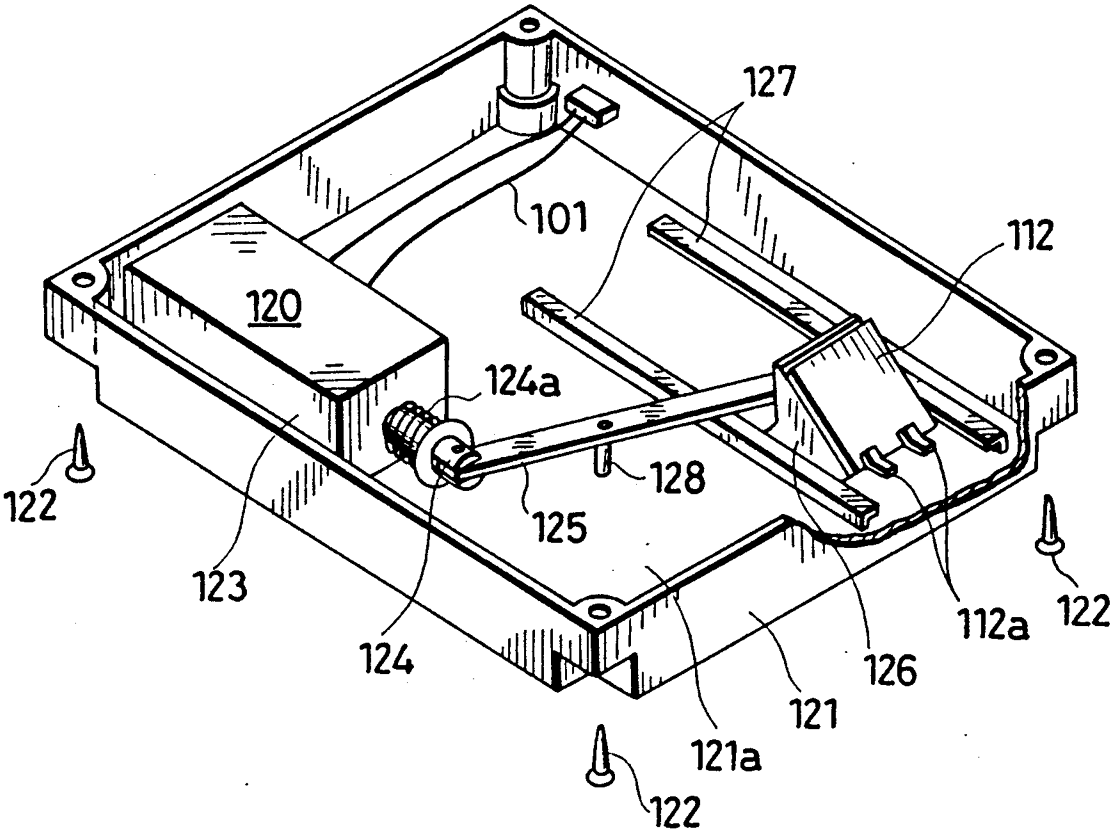
FIG. 12 is a perspective view of an inclination angle switching unit 120 of the same.

As shown in FIGS. 10 and 11, the document cover 10 comprises an upper layer 10*a* and a document pressing plate 10*b* pasted on a bottom surface of the upper layer 10*a*, the plate 10*b* being formed of a urethan foam. Four rectangular supporting containers 121, each for accommodating an inclination angle switching unit 120, are inlaid in the plate 10*b* at the corresponding positions with the those of the detection holes 12*a*. As shown in FIG. 12, each unit 120 is attached through four pins at four corners of the supporting container 121.

Figure 13:
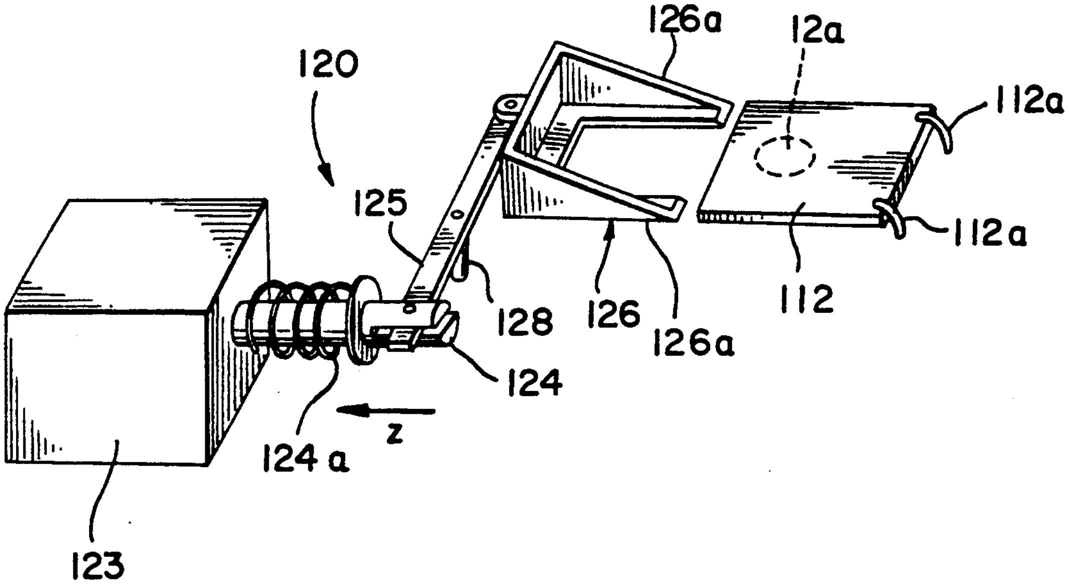
FIG. 13 is a view explaining how the inclination angle switching unit 120 works.
Figure 14:
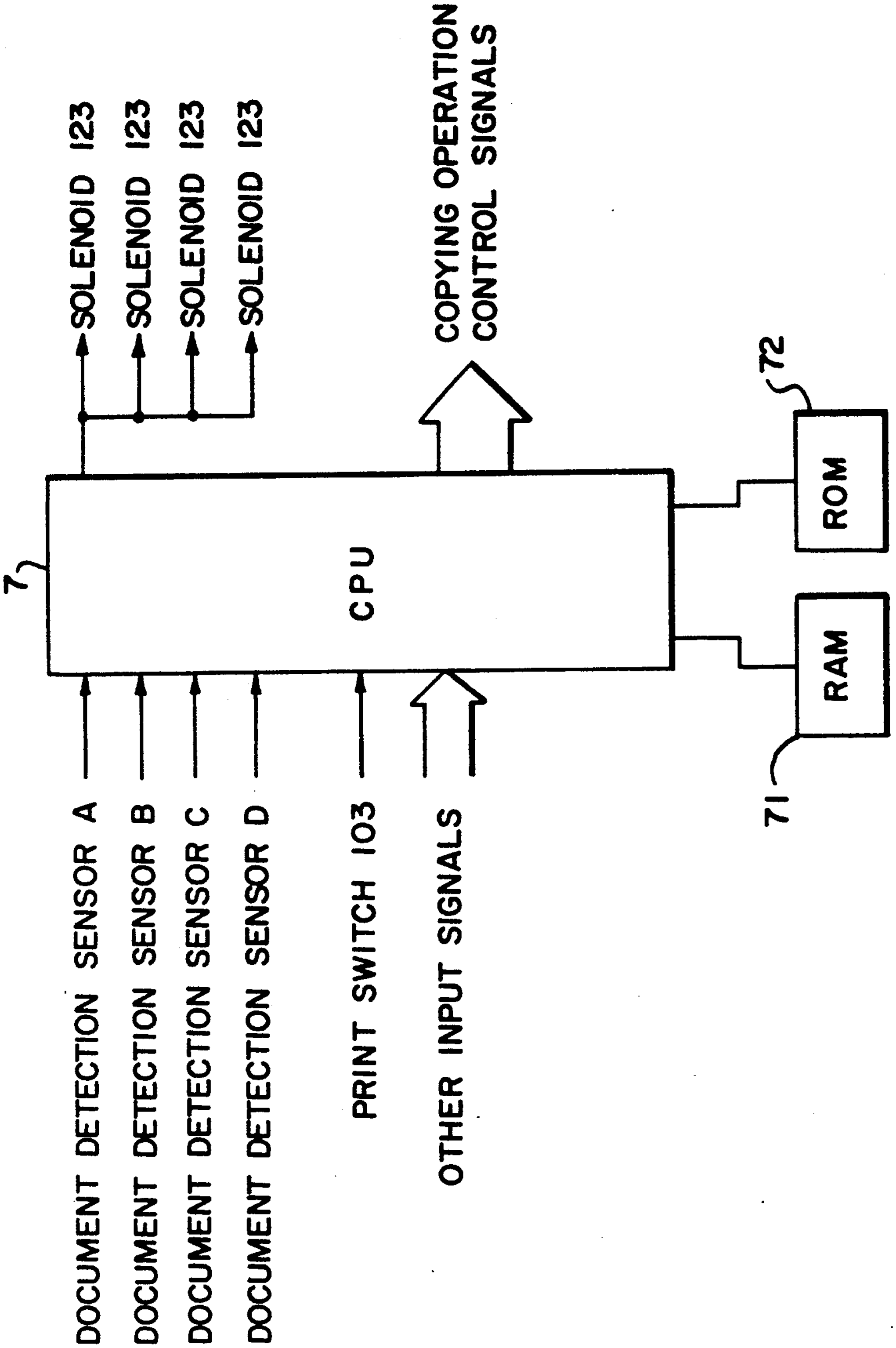
FIG. 14 is a block diagram of a first control system of the same.

As shown in FIG. 13, the inclination angle switching unit 120 comprises an on/off solenoid 123 to be switched over by the CPU 7, a lever 125 pin-connected at an end thereof to a rod 124 of the solenoid 123, a spacer 126 connected to the other end of the lever 125, and a harness 101 for connecting the solenoid 123 and the CPU 7.

The lever 125 is supported at a central portion thereof by a pin 128 standing in the supporting container 121, the lever 125 being horizontally swingable. When the solenoid 123 is turned on based on the signals from the CPU 7, the rod 124 is retracted in a direction of an arrow z, whereby the spacer 126 is pushed toward the filter 112. When the solenoid 123 is turned off, the rod 124 is moved back by a spring 124*a*, whereby the spacer 126 is pulled in the opposite direction.

The spacer 126 has a substantial C shape on a bottom surface thereof and is equipped with a pair of triangular portions 126*a* standing along front and rear sides thereof. A side end of the filter 112 is fixed on a bottom plate 121*a* of the supporting container 121 through a pair of fixing claws 112*a*.

In this construction, when the spacer 126 is pushed toward the filter 112, the triangular portions 126*a* slip under the filter 112, whereby pushing up the filter 112 by the angle of their own. A pair of rails 127 (FIG. 12) are provided to both sides of the spacer 126 for smoothing the movement of the spacer 126.

The angle of inclination of the triangular portions 126*a* is determined in advance based on experiments, etc. so that the light from the exposure lamp 21 may be guided to the photoconductive drum 3.

When the spacer 126 is pulled in the opposite direction, the filter 112 is in a lying status but the angle made by the filter 112 and the pressing sheet 12 is set so that the light from the light emitting element 111*a* and the light reflected on the document d and received by the light receiving element 111*b* may have high transmitting efficiency (for example, horizontal). The set angle is realized by adjusting the height of the fixing claws 112*a* or the like. When the before-mentioned "COLD MIRROR" is used as the filter 112, the angle of inclination should be set so that the angle of incidence of the light from the light emitting element 111*a* may be approximately 50°, in which case the highest possible transmitting efficiency is obtained.

Usually, the light is randomly reflected on the surface of the document. Therefore, it is desirable that the angle of inclination of the filter 112 is set so that the light reflected on the document d and received by the light receiving element 111*b* may have an angle of incidence of approximately 90°. However, other setting is, of course, possible.

It is during copying operation that the filter 112 gets inclined by the spacer 126. During document size detection, the spacer 126 is pulled in the opposite direction, whereby the filter 112 is in the lying status over the detection hole 12*a*.

Control system

A control system of this embodiment (FIG. 14) is the same with that of the first embodiment except the following: when the CPU 7 detects an ON-edge of the print start signal, the solenoids 123 are turned on, whereby pushing the spacers 126 to incline filters 112; and when copying is finished, the solenoids 123 are turned off to turn the filters 112 into the lying status.

Operation of the CPU 7

The operation of the CPU 7 will be described referring to FIGS. 15 and 16.

Figure 8:
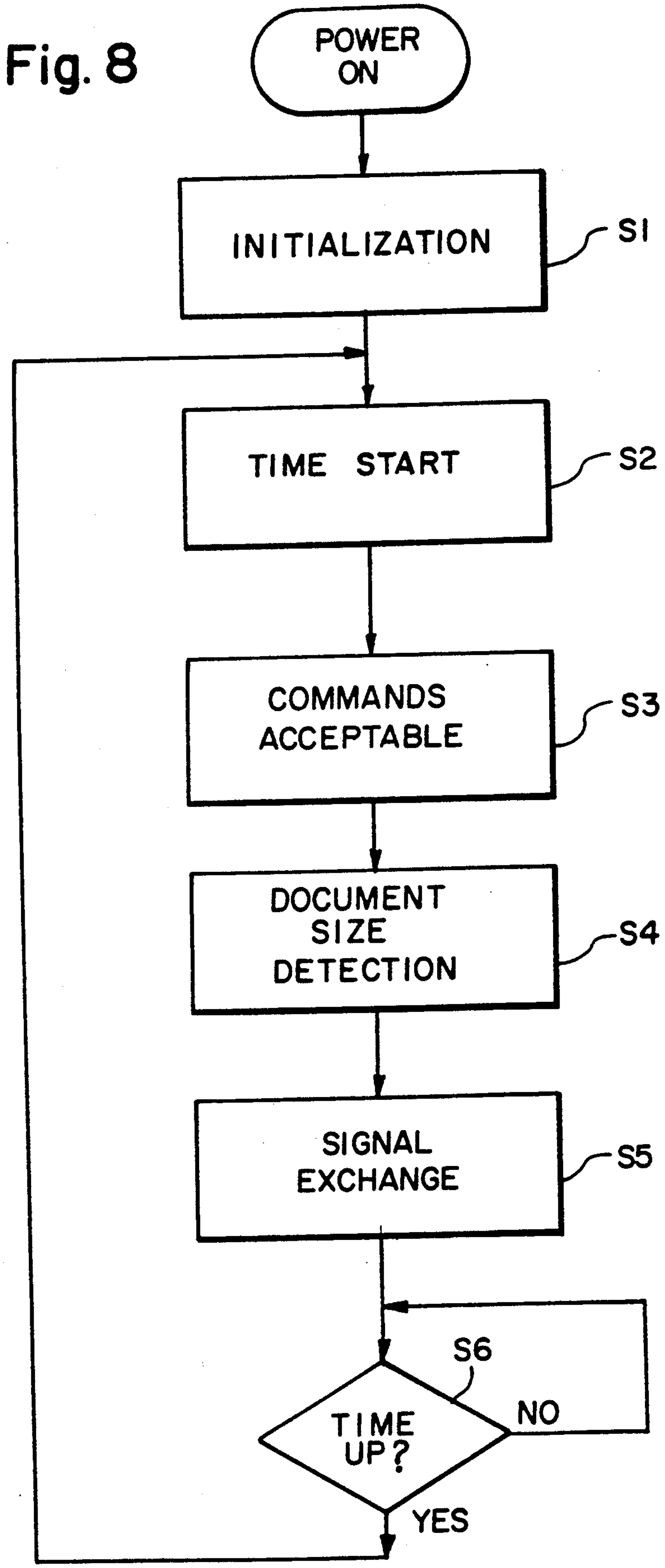
FIG. 8 is a flowchart of a main routine of a CPU 7 of the same.
Figures 9, 9A:
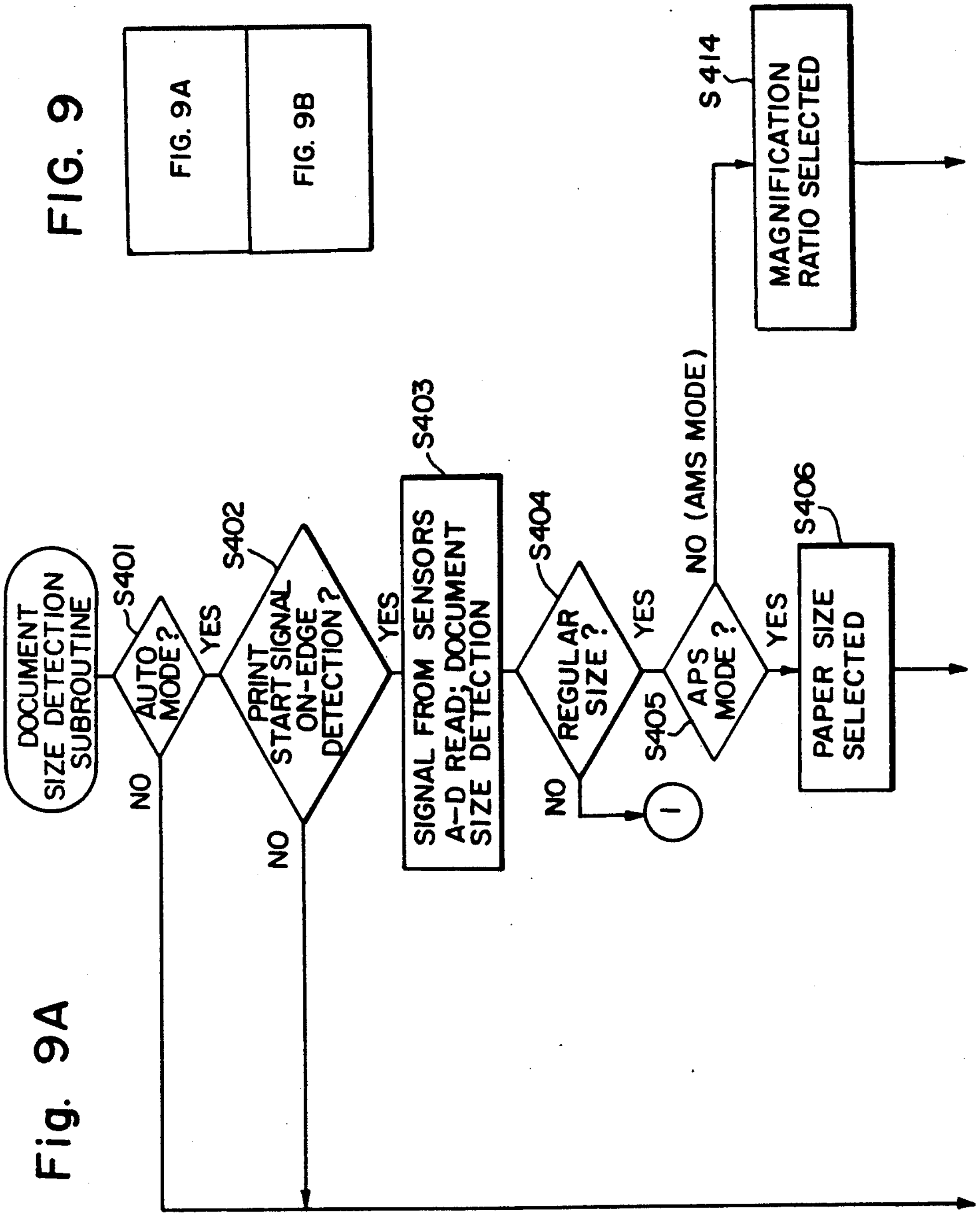
FIG. 9 (which is divided into FIG. 9*a* and 9*b*) is a flowchart of a document size detection s of the CPU 7 of the same.
Figure 9B:
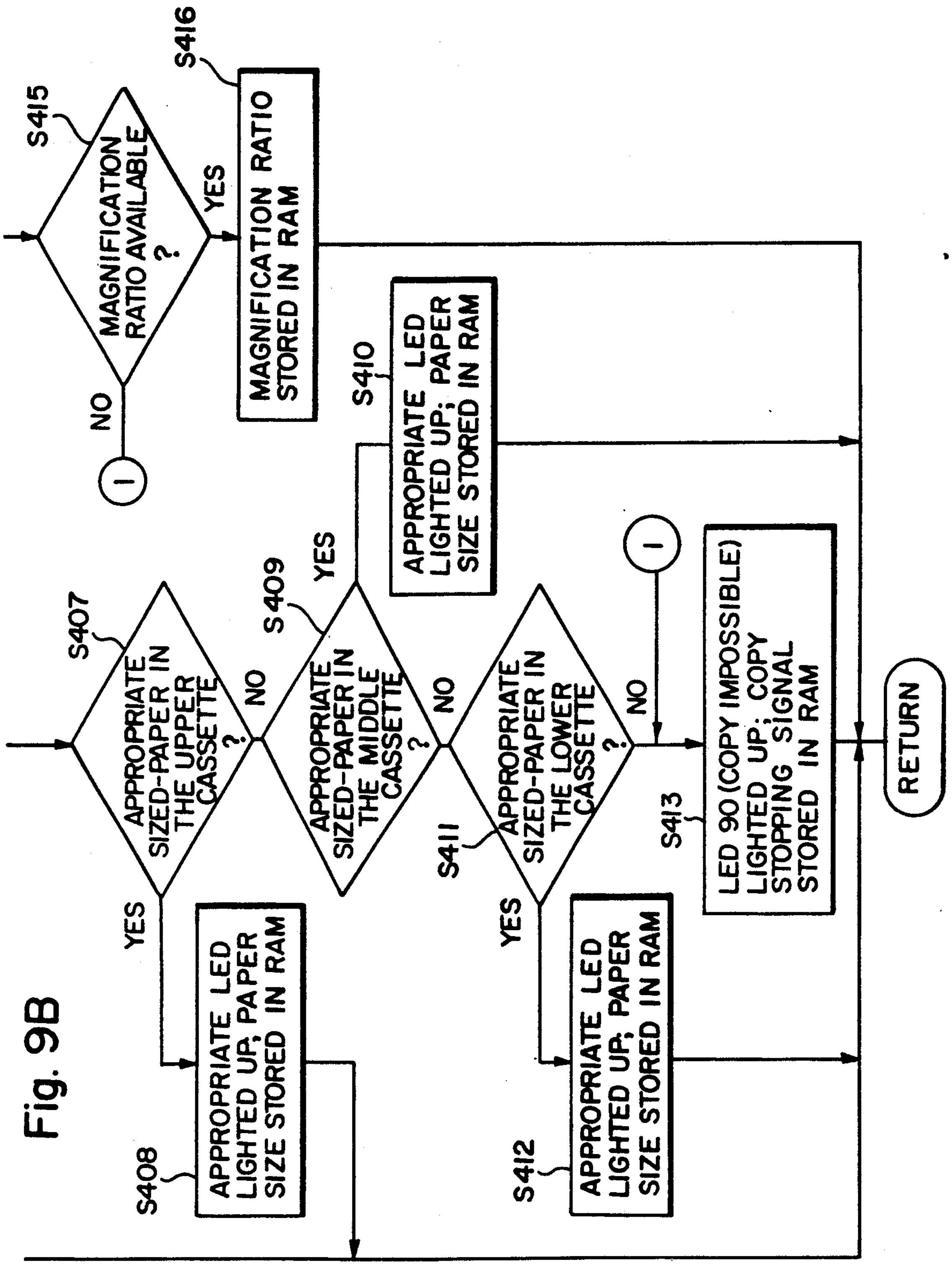
Figure 15:
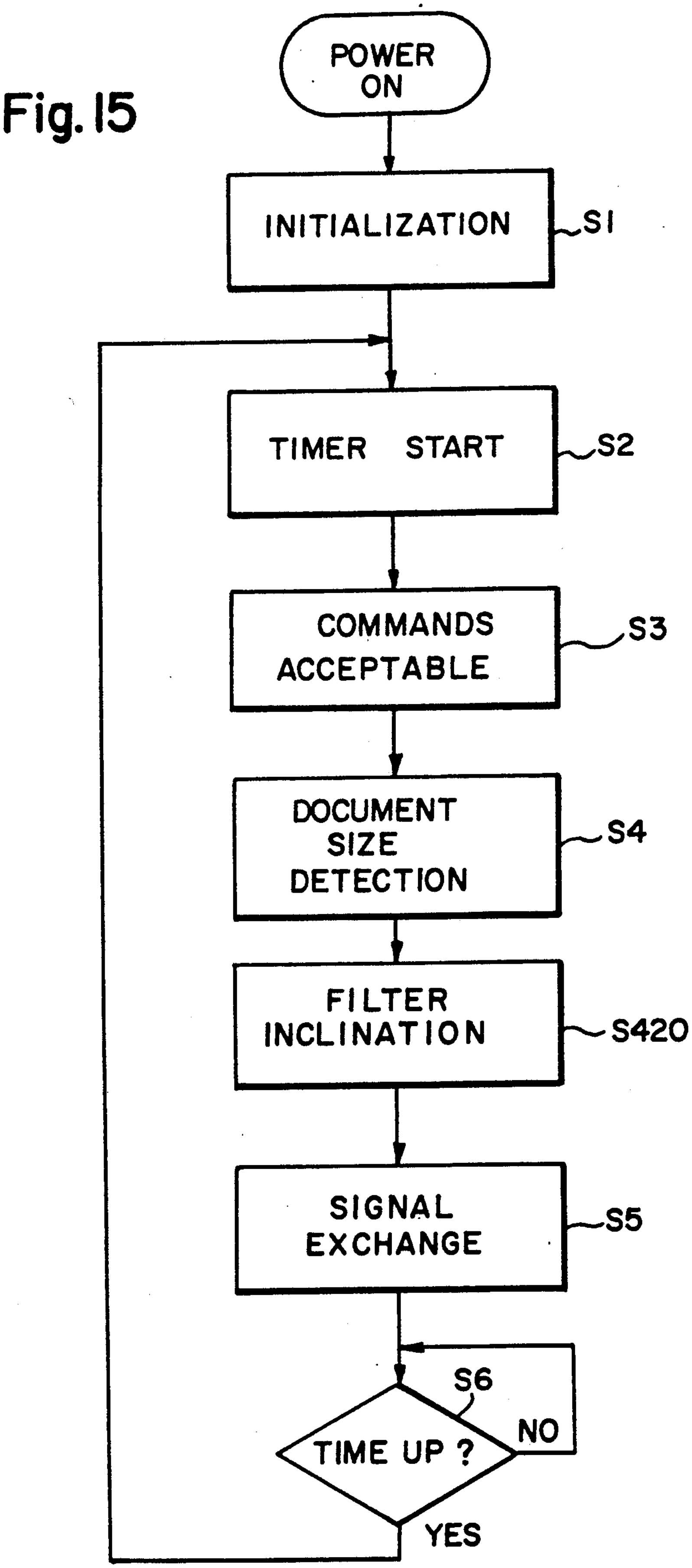
FIG. 15 is a flowchart of a main routine of a CPU 7 of the same.
Figure 16:
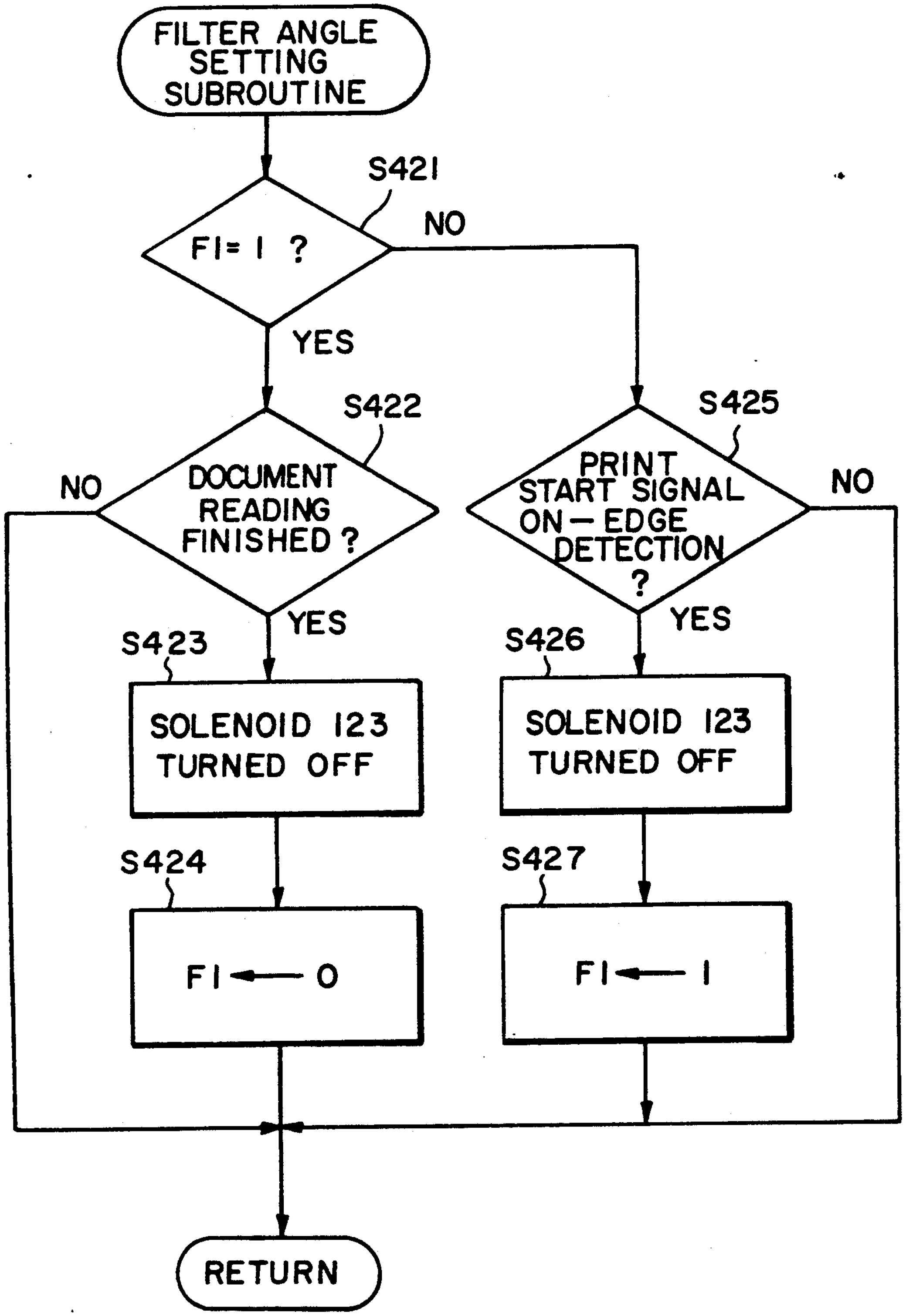
FIG. 16 is a flowchart of a filter inclination subroutine of the CPU 7 of the same.

A main routine shown in FIG. 15 is almost the same with that of FIG. 8 except: that a flag F1 for detecting copying operation execution is set 0 in S1; and that a subroutine of filter inclination is executed between the subroutine of document size detection (S4) and signal exchange with the second control unit (S5). The identical operations with those of the first embodiment will not be explained here. The subroutine of filter inclination will be described (FIG. 16).

In S421, whether the flag F1=1 or not is judged. When F1=1, that indicates that copying is now executed; and when F1≠1, that indicates that copying is stopped. If the CPU 7 judges F1=1, whether the optical system 2 has finished reading the document d or not, namely, whether exposure of the photoconductive drum 3 is finished or not, is judged (S422). If not, the operation returns to the main routine. If so, the solenoids 123 are turned off to turn the filters 112 into the lying status (S423). Then, the flag F1 is set 0 (S424) and the operation returns to the main routine.

If the CPU 7 judges F1≠1, whether an ON-edge of the print start signal is detected or not is judged (S425), and if not, the operation returns to the main routine. If so, the solenoids 123 are turned on to incline the filters 112 as shown in FIG. 12 (S426). Then, the flag F1 is set 1 (S427) and the operation returns to the main routine. Thereafter, the second control unit starts operating based on the state of the print start signal or the flag F1.

For making multiple copies from one document, one of the following construction is usable: a) in S422, whether the last exposure of the drum 3 is finished or not is judged, thereafter the solenoids 123 are turned off; or b) each time an exposure of the drum 3 is started in S425, the solenoids 123 are turned on.

In this embodiment, the filters 112 are, for example, laid down horizontally during document size detection and are inclined during copying. These two states of the filters 112 are automatically switched over. Accordingly, the paper is prevented from having a shade, and so copy quality and document size detecting accuracy are enhanced. The high detecting accuracy also lowers running costs.

Instead of switching the states of the filters 112, a plate for reflecting the light from the exposure lamp 21 may be provided so that it may be moved to below the filter 112 to cover the detection hole 12a. It should be noted, however, that this method may reduce the reflectance of the plate if the plate is stained.

Although the document detection sensors A through D use infrared rays in the above two embodiments, specific visible lights or the like may also be used.

The filters may be of other kinds than the infrared ray transmitting ones if only they reflect a light emitted from the exposure lamp 21 (having a specified wavelength or a specified angle of incidence) and guide it to the photoconductive drum while transmitting another light emitted from the light emitting element of the document detection sensor and reflected on the document d (the light having different wavelength and angle of incidence from those of the light emitted from the exposure lamp 21).

In the above embodiment, each document detection sensor has a light emitting element and a light receiving element inside the document cover 10. However, a document detection unit having either a light emitting element or a light receiving element inside the document cover may be usable. For example, a document detection unit having a light receiving element inside the document cover and a light emitting element at the corresponding position of the main body.

The number of the document detection sensors should not necessarily be four, but any number which is enough to practically detect various document sizes is acceptable.

Needless to say, the present invention is not only for use in a copier.

Although the present invention has been fully described by way of embodiments with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A document size detection device comprising:

illuminating means for irradiating a first light on a document on a platen;

projecting means for projecting the first light reflected on the document onto a photosensitive member;

a document cover for covering the document on the platen, said cover having a reflecting area for reflecting the first light emitted from said illuminating means and a non-reflecting area for transmitting the above light;

a document detection sensor provided at a position corresponding to the non-reflecting area and comprising a light emitting element and a light receiving element; and filter means for transmitting a second light from the light emitting element as well as guiding the first light emitted from said illuminating means to said projecting means, said filter means being opposed to a detecting surface of said sensor.

2. A document size detection device of claim 1, wherein the non-reflecting area of said document cover is arranged in correspondence with a size of the document.

3. A document size detection device of claim 2, wherein the non-reflecting area is a slit through which the second light is detected by said light receiving element.

4. A document size detection device of claim 1, wherein said document detection sensor emits and receives an infrared ray and said filter means transmits only an infrared ray and reflects other lights having other wavelengths.

5. A document size detection device of claim 1, wherein said filter means is inclined with such an angle that the first light emitted from said illuminating means and reflected on said filter means be guided to said projecting means.

6. A document size detection device comprising:

illuminating means for irradiating a first light on a document on a platen;

projecting means for projecting the first light reflected on the document onto a photosensitive member;

a document cover for covering the document on the platen, said cover having a reflecting area for reflecting the first light emitted from said illuminating means and a non-reflecting area for transmitting the above light;

a document detection sensor provided at a position corresponding to the non-reflecting area and comprising a light emitting element and a light receiving element;

filter means opposed to a detecting surface of said sensor;

switching means for switching said filter means to one of a first state of guiding the first light emitted from said illuminating means to said projecting means and a second state of transmitting the second light emitted from said document detection sensor and reflected on the document; and control means for controlling said switching means.

7. A document size detection device of claim 6, wherein the non-reflecting area of said document cover is arranged in correspondence with a size of the document.

8. A document size detection device of claim 7, wherein the non-reflecting area is a slit through which the second light is detected by said light receiving element.

9. A document size detection device of claim 6, wherein said document detection sensor emits and receives an infrared ray and said filter means transmits only an infrared ray and reflects other lights having other wavelengths.

10. A document size detection device of claim 6, wherein, in the first state, said filter means is inclined with such an angle that the first light emitted from said illuminating means and reflected on said filter means be guided to said projecting means.

11. A document size detection device of claim 10, wherein said switching means comprises:

supporting means for pivotally supporting said filter means;

a spacer, having an inclined portion, for inclining said filter means with the above angle when moved to a position for pushing up said filter means; and driving means for moving said spacer.

12. A document size detection device of claim 6, wherein, in the second state, said filter means is mounted with such an angle that the second light emitted from said document detection sensor be transmitted through said filter with a higher transmitting efficiency than in the first state.

13. A document size detection device of claim 6, wherein, in the second state, said filter means is substantially in parallel with the document.

14. A document size detection device of claim 6, wherein said control means controls said switching means to keep said filter means in the first state at least throughout document image reading.

15. A document size detection device of claim 6, wherein said control means controls said switching means to keep said filter means in the second state at least throughout document detection.

16. A document size detection device of claim 6, wherein said control means, for reading the same document multiple times, controls said switching means to keep said filter means in the first state from the first reading is started until the last reading is finished.

17. A document size detection device of claim 6, wherein said control means, for reading the same document multiple times, controls said switching means to switch said filter means to the first state each time the document is read.

18. In a document size detection device comprising at least an infrared ray emitting and receiving sensor provided inside a document cover of an image forming apparatus, wherein an infrared ray emitted from an emitting element of the sensor, transmitted through a detection hole provided on the document cover and reflected upon the a document is received by a receiving element of the above sensor, whereby to detect a size of the document, the improvement comprising:

an infrared ray transmitting filter is provided opposedly to a detecting area of the sensor, wherein said filter covers the detection hole, the filter being inclined with such an angle that a light from an image reading optical system of the image forming apparatus be regularly reflected on said filter and guided to an image carrier of the image forming apparatus.

19. A document size detection device claimed in claim 18, further comprising switching means for automatically switching the above angle to another angle so that said filter lie down horizontally when the image forming apparatus is in other modes than document size detection.

* * * * *